United States Patent
Chaubey et al.

(10) Patent No.: US 9,114,352 B2
(45) Date of Patent: Aug. 25, 2015

(54) STAGED MEMBRANE PROCESS FOR HIGH PRESSURE HYDROGEN PRODUCTION

(71) Applicant: L'Air Liquide Societe Anonyme Pour l'Etude et l'Exploitation des Procedes Georges Claude, Paris (FR)

(72) Inventors: Trapti Chaubey, Wilmington, DE (US); Bhadra S. Grover, Sugar Land, TX (US); Pascal Tessier, Wilmington, DE (US)

(73) Assignee: L'Air Liquide Société Anonyme Pour LÉtude Et L'Exploitation Des Procedes Georges Claude, Paris (FR)

(*) Notice: Subject to any disclaimer, the term of this patent is extended or adjusted under 35 U.S.C. 154(b) by 0 days.

(21) Appl. No.: 13/717,876

(22) Filed: Dec. 18, 2012

(65) Prior Publication Data
US 2014/0170061 A1 Jun. 19, 2014

(51) Int. Cl.
*C01B 3/02* (2006.01)
*B01D 53/22* (2006.01)
*B01D 71/02* (2006.01)
*C01B 3/50* (2006.01)
*B01D 53/04* (2006.01)

(52) U.S. Cl.
CPC ............ *B01D 53/228* (2013.01); *B01D 53/226* (2013.01); *B01D 53/229* (2013.01); *B01D 71/022* (2013.01); *C01B 3/505* (2013.01); *B01D 53/04* (2013.01); *B01D 2256/16* (2013.01); *B01D 2257/502* (2013.01); *B01D 2257/504* (2013.01); *B01D 2257/7025* (2013.01); *B01D 2257/80* (2013.01); *C01B 2203/0205* (2013.01); *C01B 2203/025* (2013.01); *C01B 2203/0283* (2013.01); *C01B 2203/043* (2013.01); *C01B 2203/145* (2013.01); *C01B 2203/147* (2013.01); *C01B 2203/148* (2013.01); *C01B 2203/86* (2013.01); *Y02C 10/10* (2013.01); *Y02C 20/20* (2013.01)

(58) Field of Classification Search
CPC ............................ B01D 53/229; B01D 71/022
USPC ........................................................ 423/648.1
IPC ......................................... B01D 53/229, 71/022
See application file for complete search history.

(56) References Cited

U.S. PATENT DOCUMENTS

| | | | | |
|---|---|---|---|---|
| 5,435,836 A * | 7/1995 | Anand et al. | ...... | 95/45 |
| 5,997,594 A * | 12/1999 | Edlund et al. | ...... | 48/76 |
| 6,329,091 B1 * | 12/2001 | James | ...... | 429/410 |
| 6,348,278 B1 * | 2/2002 | LaPierre et al. | ...... | 429/411 |
| 6,410,811 B2 * | 6/2002 | Chau et al. | ...... | 585/259 |
| 6,572,837 B1 * | 6/2003 | Holland et al. | ...... | 423/648.1 |
| 7,267,804 B2 * | 9/2007 | Buxbaum | ...... | 422/168 |

* cited by examiner

*Primary Examiner* — Paul Wartalowicz
(74) *Attorney, Agent, or Firm* — Justin K. Murray

(57) ABSTRACT

A hydrogen purification process is provided. This process includes separating hydrogen from a hydrogen containing stream in at least two sequential palladium membrane purification zones, wherein each purification zone has a permeate side, wherein the permeate side pressure of purification zones are not the same.

20 Claims, 2 Drawing Sheets

STAGED MEMBRANE PROCESS FOR HIGH PRESSURE HYDROGEN PRODUCTION

TECHNICAL FIELD

The present invention relates to process for producing high pressure hydrogen gas.

BACKGROUND

Hydrogen is very important feedstock for many chemical and petrochemical processes. It is commonly produced using Steam Methane Reforming, Partial Oxidation, Auto thermal Reforming, and Gasification etc. Carbonaceous feedstock like natural gas, coal, biomass etc. along with oxidizing agent like steam or oxygen undergoes reforming reaction to produce synthesis gas (syngas). Syngas is a mixture of hydrogen, carbon monoxide, carbon dioxide, water and un-reacted methane. Reforming reaction is highly endothermic occurring at very high temperatures of 800-1300 C and high pressures of 20-80 bar. The reforming reaction can be catalytic or non-catalytic process. Excess steam is produced in the process of cooling down syngas and flue gas. The heat required for the highly endothermic reforming reaction is provided by combustion of the carbonaceous feedstock and carbon containing off-gas. The combustion process is associated with generating greenhouse gas, carbon dioxide ($CO_2$) emissions. Syngas from reformer is further sent to water gas shift reactor to produce additional hydrogen from carbon monoxide. Water gas shift reaction produce additional carbon dioxide during the reaction. Syngas rich in hydrogen from water gas shift is further purified in a Pressure Swing Adsorption (PSA) process to produce pure hydrogen and PSA off-gas which is further used as fuel. Hydrogen production is associated with large amounts of carbon dioxide emissions. With current advancement in greenhouse gas regulations, research is underway to capture carbon dioxide from conventional hydrogen plants or reduce emissions from hydrogen plants.

Methane can be converted to hydrogen using conventional hydrogen production methods at equilibrium conditions. However, very high temperatures >900° C. and low pressures <30 bar are needed in order to achieve high methane conversions >85%. In order to provide high temperatures required for the reaction the amount of fuel consumed is very high emitting large amounts of carbon dioxide. The use of membrane reactor includes reaction and separation in the same unit allowing methane conversion higher than equilibrium conversion rate at much lower temperatures.

Membrane reactors have been used beneficially to produce hydrogen with higher methane conversion at low temperatures and simultaneously produce carbon dioxide rich stream on the retentate side with ease of $CO_2$ capture. Membranes addition inside the reactor enables the reforming and water gas shift reaction to proceed at rates higher than equilibrium. However, one of the main disadvantages of using membrane reactors is hydrogen production at low pressure <3 bar. The cost associated with compressing hydrogen product is very high and increases the overall cost of membrane reactor.

SUMMARY

This process includes separating hydrogen from a hydrogen containing stream in at least two sequential palladium membrane purification zones, wherein each purification zone has a permeate side, wherein the permeate side pressure of purification zones are not the same.

DESCRIPTION OF PREFERRED EMBODIMENTS

Figure 1:
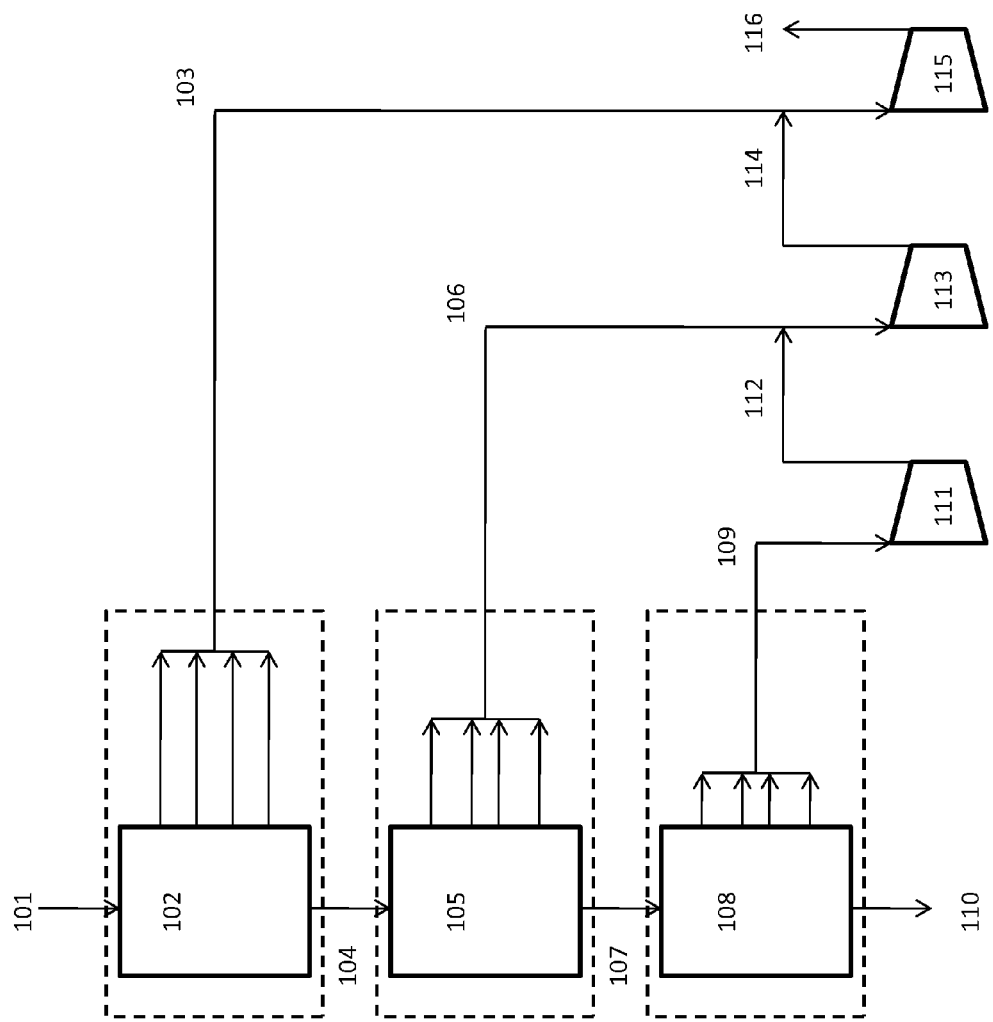
FIG. 1 is a schematic representation of one embodiment of the present invention.

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present invention deals with using the hydrogen selective membrane in stages on syngas or hydrogen containing gas downstream of a steam methane reformer, pre-reformer, gasifier or any other unit where hydrogen mixture is produced. The flux of hydrogen across the membrane depends on its partial pressure on shell side and permeates side. Hydrogen can permeate through the membrane as long as the partial pressure of hydrogen on shell side is higher than the permeate side. There will be no additional hydrogen permeation with increase in membrane surface area if the partial pressure of hydrogen is same on shell side and permeate side. The concept of staged palladium membrane is to produce hydrogen at high pressure followed by medium and low pressure. This will allow to recover a portion of hydrogen at high pressure as opposed to entire hydrogen stream at low pressure <3 bar. The goal is reduce the compression cost of hydrogen product. The stages of hydrogen selective membrane can be without catalyst in order to avoid methanation reaction or with water gas shift catalyst in order to complete the CO conversion to hydrogen. The last stage with low pressure hydrogen production can be with catalyst in order to complete methane conversion and recover remaining hydrogen. The catalytic reaction stage can be added in between the stages in order to increase the partial pressure of hydrogen in syngas and produce additional hydrogen at high pressure. Sweep gas such as steam can be used in order to increase the pressure of hydrogen from stages. Steam can also be added on the process gas side where water gas shift reaction is desired with WGS catalyst.

Hydrogen selective membrane reactors have been used to undergo reforming or water gas shift reaction along with simultaneous hydrogen separation. Palladium or its alloys are permeable to H2 but not to other gases. When $H_2$ contacts the Pd membrane, the hydrogen molecule is adsorbed on the surface where it dissociates and hydrogen atoms diffuse into the membrane Thus $H_2$ can selectively pass from one surrounding atmosphere through the palladium membrane. The selectively separated hydrogen atoms then re-combine into $H_2$ gas on the opposite side of the membrane. The difference in hydrogen partial pressure drives the permeation of hydrogen through the membrane. At a specific point on the membrane, the hydrogen flow rate is equal to the permeance multiplied by the membrane surface area multiplied by the difference of the square root of the $H_2$ feed partial pressure and the square root of the H2 permeate partial pressure, as shown by the following formula:

$$Q = P \cdot S \cdot (P_{H2,feed}^{1/2} - P_{H2,permeate}^{1/2})$$

Where Q is the hydrogen molar flow rate, P, the permeance, S the membrane surface area, $P_{H2,feed}$ the hydrogen partial pressure in the feed, and $P_{H2,permeate}$ the hydrogen partial pressure in the permeate. Permeance increases with increasing operating temperature.

Palladium membrane can be manufactured using several different techniques. US 20100132546 and US2009277331A describe the composite gas separation module including the porous metal substrate, intermediate layer and a dense gas selective metallic membrane. The intermediate layer is used to prevent porous metal support diffusion into the dense metallic membranes at operating conditions. U.S. Pat. No. 5,366,712A describes the use of porous ceramic material support for hydrogen selective membrane.

Hydrogen selective membrane can be manufactured from various different alloys including but not limited to palladium, silver, gold, platinum, yttrium, ruthenium, copper etc. The thickness of hydrogen selective dense metal layer can vary from 3 microns to 20 microns preferably from 5 micron to 10 micron. The operating temperature of hydrogen selective membrane can vary from 300° C. to 700° C. preferably from 450° C. to 550° C. The operating pressure of hydrogen selective membrane can vary from 10 bar to 90 bar.

Membrane reactors have the advantage of driving the reaction rates beyond chemical equilibrium at lower temperatures and enable gas separation in the same unit. In conventional SMR, the reaction takes place in Steam Methane Reformer (SMR) followed by Water Gas Shift (WGS) reactor and the hydrogen purification occurs in Pressure Swing Adsorption (PSA) unit. Membrane reformers can replace the SMR, WGS and PSA in a single unit. However, the hydrogen purity from membrane reformers is still questionable and a small Thermal Swing Adsorption (TSA) unit or a small PSA unit may still be needed to achieve very high hydrogen purity required by customers.

With current regulations on carbon dioxide emissions it is important to capture $CO_2$ from the hydrogen plants. In a conventional SMR unit carbon dioxide can be captured from syngas or PSA off-gas. The $CO_2$ content in PSA off-gas is less than 50% and is available at low pressure (<2 bar). The $CO_2$ content in syngas is less than 25% and is available at syngas pressure 20-30 bar. In the case of a membrane reformer the shell-side gas is rich in $CO_2$ with more than 80% concentration on dry basis and is available at high pressure (feed pressure) 30-40 bar. It is advantageous to capture $CO_2$ from membrane reformer as it is available at higher content and high pressure making the capture process much simpler than the capture process from conventional SMR. However, the hydrogen product on the permeate side is at low pressure <10 bar mostly <3 bar. Hydrogen product cannot be produced at high pressure in the catalytic membrane reactor because the hydrogen partial pressure always remain low on the shell side and it permeates on the permeate side as soon as it is formed. Hydrogen product is mostly needed at high pressure >20-40 bar for most of the chemical processes. The cost of hydrogen product compression from 1-10 bar to 20-40 bar requires multiple compression stages and increases the overall cost of hydrogen production making the use of membrane reformers uneconomical. Another disadvantage of membrane reformers with catalyst and membrane together is that the reaction kinetics and hydrogen permeability rate is very crucial. If the reaction kinetics is too fast catalyst will act intermittently with surges waiting for the hydrogen to permeate through the membrane underutilizing the catalyst area. If the hydrogen permeation is too fast the flux of hydrogen will be low as the hydrogen partial pressure on the shell side will be low underutilizing the membrane area. The material compatibility of catalyst with membrane can also be an issue. In few cases catalyst are known to scratch the membrane surface causing defects on the membrane. In order to better utilize the catalyst or membrane area and avoid compatibility issues staged process has been proposed in the past. The concept of staged membrane process has been described in patent application US2008/0311013A1 where the catalytic reactor is separated from membranes in order to better utilize the catalyst and membrane area. However the proposed solutions produce hydrogen at low pressure on the permeate side. All the permeate streams are mixed from the stages to deliver hydrogen at low pressure.

The current invention deals with the use of staged membrane process with hydrogen product withdrawal at different pressures in order to reduce cost of hydrogen product compression. The staged membrane process can be used on a mixture of gases with hydrogen from refinery or any other chemical processes. The proposed solution can be used on syngas obtained from Steam Methane Reformer. The SMR can operate at 650-950° C. and 20-45 bar pressure in order to produce hydrogen at partial pressure from 7 bar to 22 bar. The proposed solution can be used on syngas produced from pre-reformer at 500-700 C at 30-45 bar in order to produce hydrogen at 3 to 13 bar partial pressure.

Gasifiers using coal, biomass or other carbon containing feed stock can also be used at 900-1400 C and 20-80 bar in order to produce hydrogen at 8 to 30 bar partial pressure. The high partial pressure of hydrogen is favorable to produce hydrogen at high pressure. Syngas with high hydrogen partial pressure can also be produced using high pressure partial oxidation or auto thermal reforming. The staged membrane process can be used to produce hydrogen at different pressures in order to reduce the hydrogen product compression cost. The number of stages can vary from 2 to 6. Each staged membrane process unit can be with or without catalyst. Water gas shift catalyst may be used in order to complete the CO conversion to hydrogen and increase the partial pressure of hydrogen in syngas. Reforming or pre-reforming catalyst may not be used in the first stage because of potential reverse methanation reaction. Reforming or pre-reforming catalyst can be added in a stage where hydrogen partial pressure is low and methanation reaction is not favorable in order to complete the methane conversion and produce additional hydrogen. Hydrogen product from different stages with same pressure can be mixed and directed to a compression stage.

For example, the staged membrane process can be used as shown in FIG. 1 in order to produce hydrogen at high pressure followed by medium and low pressure. This allows reducing the compression energy of hydrogen product and overall compression cost of hydrogen. The hydrogen permeate from first stage can be produced at 5 bar to 30 bar. The hydrogen permeate from second stage can be produced at 3 bar to 20 bar. The hydrogen permeate from third stage can be produced from 1 bar to 10 bar. Multi-stage reforming, pre-reforming or gasification can also be used by recycling the hydrogen depleted syngas to the second stage of reforming to increase partial pressure of hydrogen.

Turning to FIG. 1, syngas 101 generated from a pre-reformer, reformer or gasifier (not shown) enters first stage 102 Pd membrane. This generates high pressure hydrogen permeate stream 103, and retentate stream 104. Retentate stream 104 then enters second stage 105 Pd membrane. This generates medium pressure hydrogen permeate stream 106, and retentate stream 107. Retentate stream 107 then enters third stage 108 Pd membrane. This generates low pressure hydrogen permeate stream 109, and carbon dioxide rich retentate stream 110.

Low pressure hydrogen permeate stream 109 may be sent to first compressor 111.

This produces a second medium pressure hydrogen stream 112, the pressure of which is approximately the same as that of medium pressure hydrogen permeate stream 106. Medium pressure hydrogen permeate stream 106 and medium pressure hydrogen stream 112 may be combined and then may be sent to second compressor 113. This produces a second high pressure hydrogen stream 114, the pressure of which is approximately the same as that of high pressure permeate stream 103. High pressure hydrogen permeate stream 103 and high pressure hydrogen stream 114 may be combined and then may be sent to booster 115 to further increase the pressure of the stream. Boosted hydrogen stream 116 may then be used in subsequent processes (not shown).

Figure 2:
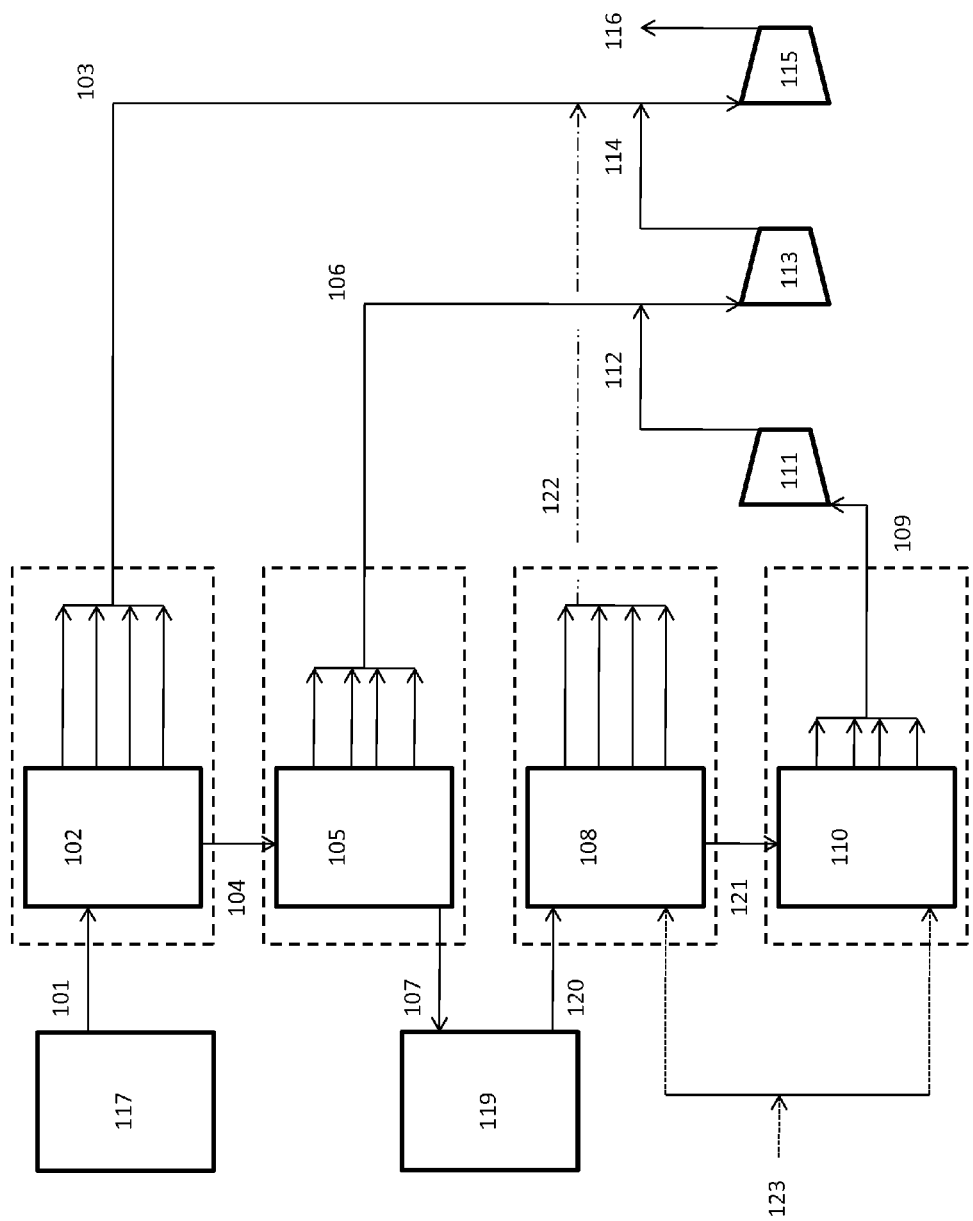
FIG. 2 is a schematic representation of one embodiment of the present invention.

This hydrogen rich syngas can be sent to staged membrane process in order to recover additional hydrogen at high pressure as shown in FIG. 2. Sweep gas 123 such as steam can be used in the stages in order to increase the permeate pressure of the hydrogen. The permeate gas which is a mixture of hydrogen and steam can be further cooled down and condensed in order to separate hydrogen from steam.

In order to minimize ambiguity, the numbering convention is maintained for all figures. Turning to FIG. 2, syngas 101 generated from a pre-reformer, reformer or gasifier 117 enters first stage 102 Pd membrane. This generates high pressure hydrogen permeate stream 103, and retentate stream 104. Retentate stream 104 then enters second stage 105 Pd membrane. This generates medium pressure hydrogen permeate stream 106, and retentate stream 107. Retentate stream 107 is returned to a second stage 119 of pre-reformer, reformer or gasifier 117. Second syngas stream 120 then enters third stage 108 Pd membrane. This generates second high pressure hydrogen permeate stream 122, and retentate stream 121. Retentate stream 121 then enters fourth stage 110 Pd membrane. This generates low pressure hydrogen permeate stream 109, and carbon dioxide rich retentate stream 118.

Low pressure hydrogen permeate stream 109 may be sent to first compressor 111. This produces a second medium pressure hydrogen stream 112, the pressure of which is approximately the same as that of medium pressure hydrogen permeate stream 106. Medium pressure hydrogen permeate stream 106 and medium pressure hydrogen stream 112 may be combined and then may be sent to second compressor 113. This produces a third high pressure hydrogen stream 114, the pressure of which is approximately the same as that of high pressure permeate stream 103 and second high pressure hydrogen permeate stream 122. High pressure hydrogen permeate stream 103, second high pressure permeate steam 122, and high pressure hydrogen stream 114 may be combined and then may be sent to booster 115 to further increase the pressure of the stream. Boosted hydrogen stream 116 may then be used in subsequent processes (not shown). The palladium membrane may also be catalytic. Typically, the last stage is catalytic in order to increase the methane conversion (108 in FIGS. 1 and 110 in FIG. 2).

The TSA system can be used to completely dry hydrogen gas. TSA or PSA unit can be used on hydrogen product gas in order to remove any trace impurities like carbon monoxide, carbon dioxide, methane or water and produce high purity hydrogen. The carbon dioxide rich stream from the shell side of membrane can be further purified using cryogenic process or any other purification process. The pure carbon dioxide can be captured and used for enhanced oil recovery or sent for geological sequestration, deep saline aquifer etc.

What is claimed is:

1. A hydrogen purification process comprising the steps of:
   feeding a syngas stream into a first palladium membrane purification zone under conditions effective to produce a first permeate and a first retentate, wherein the first permeate has a higher concentration of hydrogen as compared to the syngas stream;
   introducing the first retentate into a second palladium membrane purification zone under conditions effective to produce a second permeate and a second retentate, wherein the second permeate has a higher concentration of hydrogen as compared to the first retentate, wherein the pressure of the first permeate is greater than the pressure of the second permeate;
   pressurizing the second permeate in a first compressor to match the pressure of the first permeate to produce a pressurized second permeate; and
   combining the pressurized second permeate with the first permeate to form a first mixed permeate stream.

2. The hydrogen purification process of claim 1, further comprising the steps of:
   introducing the second retentate into a third palladium membrane purification zone under conditions effective to produce a third permeate and a third retentate, wherein the third permeate has a higher concentration of hydrogen as compared to the second retentate, wherein the pressure of the second permeate is greater than the pressure of the third permeate;
   pressurizing the third permeate in a second compressor to match the pressure of the second permeate to produce a pressurized third permeate; and
   combining the pressurized third permeate with the second permeate prior to the step of pressurizing the second permeate to match the pressure of the first permeate.

3. The hydrogen purification process of claim 2, wherein the third permeate has a pressure of between 1 bar and 10 bar.

4. The hydrogen purification process of claim 1, wherein the syngas stream has a pressure of between 20 and 80 bar.

5. The hydrogen purification process of claim 4, wherein the syngas stream has a pressure of between 20 and 45 bar.

6. The hydrogen purification process of claim 1, wherein the syngas stream has a pressure of between 30 and 45 bar.

7. The hydrogen purification process of claim 1, wherein the first permeate has a pressure of between 5 bar and 30 bar.

8. The hydrogen purification process of claim 1, Wherein the second permeate has a pressure of between 3 bar and 20 bar.

9. The hydrogen purification process of claim 1, wherein a sweep gas is used in at least one of the palladium membrane purification zones.

10. The hydrogen purification process of claim 1, wherein all the palladium membrane purification zones are contained within a single vessel.

11. The hydrogen purification process of claim 1, wherein each palladium membrane purification zone is contained in a discrete vessel.

12. The hydrogen purification process of claim 1, father comprising an absence of a reforming step between sequential membranes.

13. A hydrogen purification process comprising the steps of,
feeding a hydrogen containing gas stream into a first palladium membrane purification zone under conditions effective to produce a first permeate and a first retentate, wherein the first permeate has a higher concentration of hydrogen as compared to the hydrogen containing gas stream;
introducing the first retentate into a second palladium membrane purification zone under conditions effective to produce a second permeate and a second retentate, wherein the second permeate has a higher concentration of hydrogen as compared to the first retentate, wherein the pressure of the first permeate is greater than the pressure of the second permeate;
pressurizing the second permeate in a first compressor to match the pressure of the first permeate to produce a pressurized second permeate;
combining the pressurized second permeate with the first permeate to form a first mixed permeate stream;
introducing the second retentate into an external process to produce a second hydrogen containing gas stream, wherein the external process is selected from the goup consisting of a reforming process, a pre-reforming process, and a catalytic reaction process;
introducing the second hydrogen containing gas stream into a third palladium membrane purification zone under conditions effective to produce a third permeate and a third retentate, wherein the third permeate has a higher concentration of hydrogen as compared to the second hydrogen containing gas stream, wherein the pressure of the third permeate is greater than the pressure of the second permeate; and
combining the third permeate with the first permeate.

14. The hydrogen purification process of claim 13, wherein at least one of the palladium membrane purification zones contains a catalyst.

15. The hydrogen purification process of claim 14, wherein the catalyst is random or loose filled.

16. The hydrogen purification process of claim 14, wherein the catalyst is structured.

17. The hydrogen purification process of claim 14, wherein the catalyst coats the surface of the membrane.

18. The hydrogen purification process of claim 14, wherein a single palladium membrane purification zone contains catalyst.

19. The hydrogen purification process of claim 18, wherein the palladium membrane purification zone containing catalyst is the most downstream palladium membrane purification zone.

20. The hydrogen purification process of claim 13, further comprising the steps of:
introducing the third retentate into a fourth palladium membrane purification zone under conditions effective to produce a fourth permeate, wherein the fourth permeate has a higher concentration of hydrogen as compared to the third retentate, wherein the pressure of the second permeate is greater than the pressure of the fourth permeate;
pressurizing the fourth permeate in a second compressor to match the pressure of the second permeate to produce a pressurized fourth permeate; and
combining the pressurized fourth permeate with the second permeate prior to the step of pressurizing the second permeate to match the pressure of the first permeate.

* * * * *